US009400755B2

(12) United States Patent
Stafford et al.

(10) Patent No.: US 9,400,755 B2
(45) Date of Patent: *Jul. 26, 2016

(54) PASSWORD ACCESSIBLE MICROELECTRONIC MEMORY

(71) Applicant: Micron Technology, Inc., Boise, ID (US)

(72) Inventors: William Stafford, Folsom, CA (US); Todd Legler, Shingle Springs, CA (US); David Kiss, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/694,177

(22) Filed: Apr. 23, 2015

(65) Prior Publication Data

US 2015/0227471 A1 Aug. 13, 2015

Related U.S. Application Data

(63) Continuation of application No. 12/411,453, filed on Mar. 26, 2009, now Pat. No. 9,037,824.

(51) Int. Cl.
*G06F 12/14* (2006.01)

(52) U.S. Cl.
CPC .......... *G06F 12/145* (2013.01); *G06F 12/1441* (2013.01); *G06F 2212/1052* (2013.01)

(58) Field of Classification Search
None
See application file for complete search history.

(56) References Cited

U.S. PATENT DOCUMENTS

| 4,786,900 | A | * | 11/1988 | Karasawa | ......... | G07C 9/00031 340/5.32 |
| 6,079,019 | A | * | 6/2000 | Fukuzumi | ........... | G06F 12/1466 711/164 |
| 2004/0059925 | A1 | * | 3/2004 | Benhammou | ....... | G06F 12/1458 713/189 |
| 2005/0273858 | A1 | | 12/2005 | Zadok et al. | | |
| 2006/0272011 | A1 | | 11/2006 | Ide et al. | | |
| 2007/0067590 | A1 | | 3/2007 | Savagaonkar et al. | | |
| 2007/0192634 | A1 | | 8/2007 | Cheon et al. | | |
| 2008/0244608 | A1 | | 10/2008 | Daito | | |
| 2009/0240923 | A1 | * | 9/2009 | Covey | ................. | G06F 9/30167 712/220 |
| 2011/0153697 | A1 | | 6/2011 | Nickolov et al. | | |

OTHER PUBLICATIONS

Skorobogatov, "Semi-invasive attacks—A new approach to hardware security analysis", Apr. 2005, 1-144.

* cited by examiner

*Primary Examiner* — Kevin Verbrugge
(74) *Attorney, Agent, or Firm* — Dorsey & Whitney LLP

(57) ABSTRACT

A microelectronic memory may be password access protected. A controller may maintain a register with requirements for accessing particular memory locations to initiate a security protocol. A mapping may correlate which regions within a memory array are password protected. Thus, a controller can use a register and the mapping to determine whether a particular granularity of memory is password protected, what the protection is, and what protection should be implemented. As a result, in some embodiments, a programmable password protection scheme may be utilized to control a variety of different types of accesses to particular regions of a memory array.

20 Claims, 1 Drawing Sheet

PASSWORD ACCESSIBLE MICROELECTRONIC MEMORY

CROSS-REFERENCE TO RELATED APPLICATION(S)

This application is a continuation of U.S. patent application Ser. No. 12/411,453 filed Mar. 26, 2009, which issued as U.S. Pat. No. 9,037,824, which is hereby incorporated by reference, in its entirety for any purpose.

BACKGROUND OF THE INVENTION

This relates generally to microelectronic memories.

Examples of microelectronic memories include flash memories, electrically erasable programmable read only memories, phase change memories, dynamic random access memories, and static random access memories. Each of these memories are generally accessed by a host device. In some cases, these memories may store information which is confidential or sensitive. Thus, it may be desirable to preclude unauthorized persons from accessing this information.

DETAILED DESCRIPTION

Figure 1:
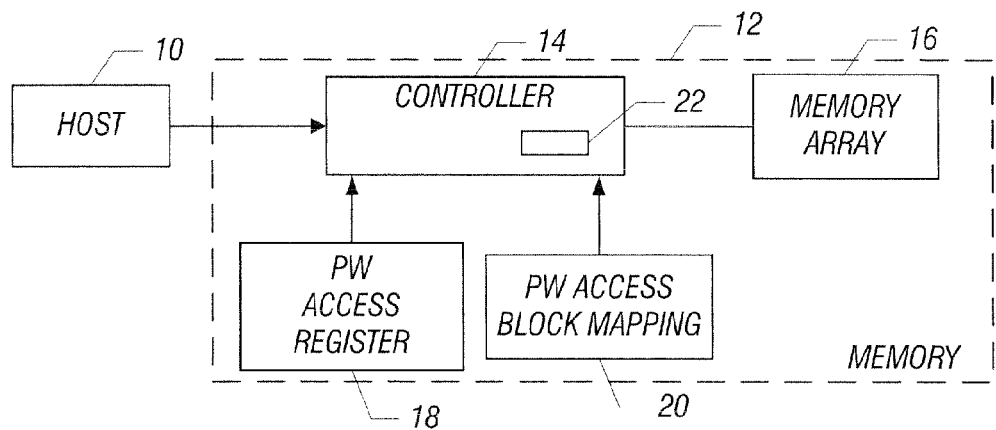
FIG. 1 is a system depiction of one embodiment.

Referring to FIG. 1, in accordance with one embodiment, a host 10 may communicate with a microelectronic memory 12. The microelectronic memory may be any type of memory, including as examples flash memories, electrically erasable programmable read only memories, phase change memories, dynamic random access memories, and static random access memories.

The host 10 may, for example, be a computer system or any processor-based system, including a personal computer, a laptop computer, a set top box, a camera, a graphics controller, a cell phone, a processor, or a controller, to mention a few examples. The memory 12 may be internal or may be external to the host 10. The memory 12 may be accessed by the host 10 to perform operations such as accessing data stored in the memory array 16, writing information to the memory array 16, and configuring or programming the controller 14 to do certain functions under command of the host 10, to mention a few examples.

In one embodiment, the controller 14 may access a password access register 18 and a password access block mapping storage 20. As used herein, a "password" is any secret code, be it a number, a pattern, or text. The password access block mapping storage 20 may indicate which blocks within the memory array 16 may be password access controlled. While blocks are described herein, the present invention is not limited to any particular granularity of the memory array. The password access register 18 may provide information about the type of access control that may be implemented by password protection. For example, in some embodiments, the password access register 18 may include bits to indicate selected password access modes.

In one embodiment, the password access register may include 16 bits. One bit may indicate whether a given granularity of the memory array, such as a particular block, is protected from even being read. For example, the bit may be a 0 or 1 to indicate whether read protection is enabled or disabled, in one embodiment.

A second bit in the register 18 may indicate whether or not a given block (or other granularity of memory) is modify protected. In such case, the block may be prevented from being changed (i.e., written to). Again, the bit may be a 1 or a 0 to indicate that this capability is either enabled or disabled.

Still another bit may indicate whether each of a plurality of blocks is permanently protected against being rewritten. Again, the bit may be a 1 or a 0 to indicate whether the permanent protection is enabled or disabled.

Still another bit may indicate whether a password is needed to update the read block lock map in mapping storage 20. Still another bit may indicate whether a password is needed to update the modify block lock map in mapping storage 20. Finally, still another bit may indicate whether a password is needed to update the permanent block lock map in mapping storage 20.

An additional two bits may indicate the password size. The password size may be 64 bits, 128 bits, or 256 bits, in some embodiments. However, different numbers of bits implementing different access controls may be used in other embodiments.

In password access read blocking, reading is prevented. In modify blocking, modifying of the stored information may be prevented, even if reading is otherwise allowed. A permanent block lock map indication indicates that the given block is permanently locked and cannot ever be modified. It may or may not be readable.

The password access block mapping storage 20 may indicate to the controller 14 which blocks (or other memory granularities) are password accessible. Once it is known that a given block (or other granularity) must be accessed with a password, the password access register 18 may be accessed to determine the type of access protection that is involved. In one embodiment, the register 18 and storage 20 may be combined in one unit.

Thus, in some embodiments, the actual data stored in the memory array may be protected with one or more passwords. Only those users who have the correct password can access the protected data. In some embodiments, even though a given block is password protected, it may be read freely, but may not be modified. Thus, the information may be read, but, in some cases, not modified. In other cases, it cannot even be read without a password.

Thus, in order to program the password protection status, commands may be provided by the host to the controller. A plurality of commands may be provided that are distinguishable, one for each of the different modes. The different password modes may include, in one embodiment, no protection enabled; permanent protection enabled; modify protection enabled; and read protection enabled; permanent protect and modify protect, both enabled; permanent protect only enabled; modify protect and read protect enabled; and modify protect only enabled. Those skilled in the art would appreciate a number of other programmable password protection modes.

Figure 2:
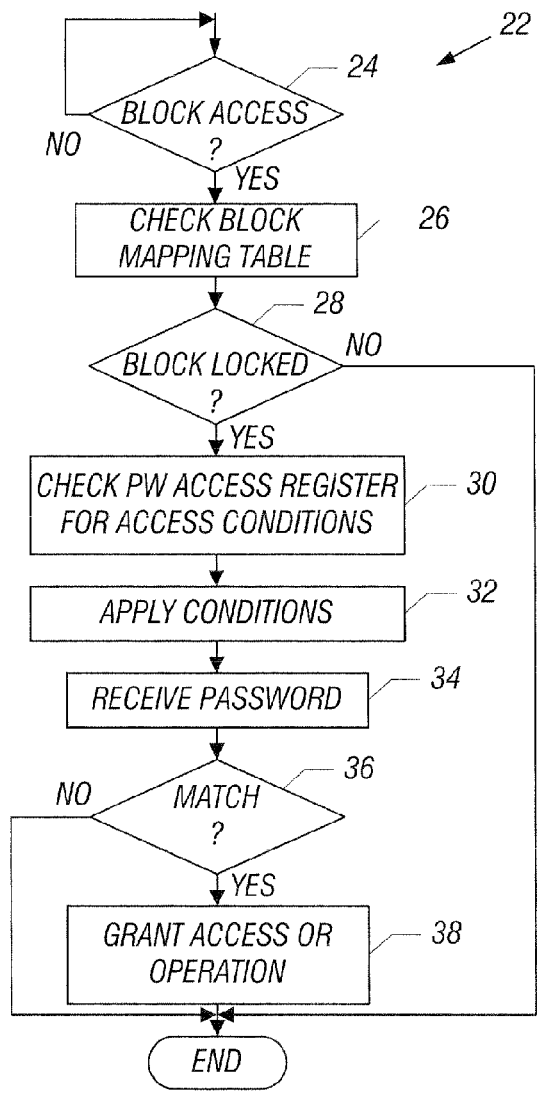
FIG. 2 is a flow chart for one embodiment.

Referring to FIG. 2, in accordance with one embodiment of the present invention, a sequence of operations may be implemented in hardware or software. In the software embodiment, the sequence may be implemented in a computer readable medium, such as the memory array 16, or a memory on board the controller 14, to mention two examples. In still other embodiments, the sequence may be implemented by the host 10.

Initially, a check at diamond 24 indicates whether or not the host 10 is attempting to access a granularity, such as a block, within the memory array 16. If so, a check of the mapping storage 20, at block 26, determines whether or not the access granularity, such as a block, is password protected. If the block is locked (i.e. password protected), as determined in diamond 28, a check of the password access register 18 determines the type of access conditions that are applicable, as indicated in block 30. The conditions may then be implemented, as indicated in block 32. These conditions may involve requesting a password via a user interface or waiting for receipt of the password for a given period of time, as two examples. When the password is received, as indicated at block 34, a comparison of the received password to a stored password is undertaken, as indicated in diamond 36. If there is a match, the access may be granted or the requested operation, such as programming the protected password mode, may be implemented.

The password may be stored in the sequence where the host programs the controller 14 with the desired access control mode, together with a password for each mode. The password may be reprogrammably stored on board the controller 24 in one embodiment.

In some embodiments, the password status may be implemented during the manufacturing process. In other embodiments, it may be programmed by appropriate commands by the first purchaser from the manufacturer. In some cases, the first purchaser is not the end user, but may set up the access passwords as desired. And, in some cases, the access limitations may be applied by the end user. Thus, different parties may be given the commands to program the desired level of password security.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving, with a controller, a command of a plurality of commands, each command of the plurality of commands indicative of a respective access control mode of a plurality of access control modes;
   assigning password protection to a first region of memory in response to receipt of the command, the first region included in a first memory;
   storing a location of the first region in a mapping storage accessible to the controller; and
   storing an access condition of the first region in an access register accessible to the controller, wherein the access condition is based, at least in part, on the access control mode of the plurality of access control modes, wherein the controller is configured to access the mapping storage and access register when a request to access the first region is received.

2. The method of claim 1, wherein the access condition of the first region of memory includes requiring a password to write to the first region.

3. The method of claim 1, wherein the access condition of the first region of memory includes requiring a password to read from the first region.

4. The method of claim 1, further comprising:
   receiving, with the controller, a second command of the plurality of commands;
   assigning free access to a second region of memory in response to receipt of the second command, the second region included in the first memory;
   storing a location of the second region in the mapping storage; and
   storing an access condition of the second region in the access register.

5. The method of claim 4, wherein the access condition of the second region includes allowing reading from and writing to the second region without a password.

6. The method of claim 1, further comprising protecting the mapping storage from modification.

7. The method of claim I, wherein storing the access condition of the first region in the access register includes storing a plurality of bits, each bit indicating whether one of a plurality of password protection modes is enabled or disabled.

8. The method of claim 7, wherein the plurality of password protection modes includes read protection, modify protection, and permanent protection from being rewritten.

9. A non-transitory computer readable medium storing instructions that, when executed:
   receive, with a controller, a command of a plurality of commands, each command of the plurality of commands indicative of a respective access control mode of a plurality of access control modes;
   assign a password protection mode to a first region of memory in response to receipt of the command, the first region of memory included in a first memory; and
   implement access conditions of the first region in accordance with the access control mode of the plurality of access control modes.

10. The non-transitory computer readable medium of claim 9, further storing instructions that, when executed:
    receive a request from the host to access the first region;
    in response to the request to access the first region, check a second region of memory to determine the password protection mode of the first region;
    if the first region is password protected, based on the password protection mode:
    check a third region of memory for the access conditions of the first region, the third region included in a second memory unit separate from the first memory unit; and
    request a password from the host based on the access conditions.

11. The non-transitory computer readable medium of claim 10, wherein the third region of memory includes a control access register.

12. The non-transitory computer readable medium of claim 9, further storing instructions that, when executed:
    maintain a password access block mapping storage to indicate, for each of a plurality of blocks of the first region, the password protection mode.

13. The non-transitory computer readable medium of claim 12, wherein the password access block mapping storage is included in the second region of memory.

14. The non-transitory computer readable medium of claim 12, further storing instructions that, when executed:
    enable selection of the password protection mode from a plurality of password protection modes that include read protection, modify protection, permanent protection from being rewritten, and protection from modifying the mapping storage.

15. An apparatus comprising:
a memory array;
a controller coupled to the memory array;
an access block mapping storage accessible to the controller; and
an access register accessible to the controller;
wherein the controller is configured to:
assign password protection to a first region of the memory array in response to receipt of a command of a plurality of commands, each command of the plurality of commands indicative of a respective access control mode of a plurality of access control modes;
store a location of the first region in the access block mapping storage; and
store an access condition of the first region in the access register, wherein the access condition is based, at least in part, on the access control mode of the plurality of access control modes.

16. The apparatus of claim 15, wherein the controller is further configured to access the access block mapping storage and access register when a request to access the first region is received.

17. The apparatus of claim 15, wherein the access block mapping storage and the access register are included in a single unit.

18. The apparatus of claim 15, wherein responsive to a request to access the first region, the controller is configured to:
check the access block mapping storage to determine if the first region is password protected with a password; and
if the first region is password protected, check the access register for the access conditions of the first region.

19. The apparatus of claim 15, wherein the access block mapping storage is protected from modification.

20. The apparatus of claim 15, wherein the memory array includes a plurality of regions, wherein each of the plurality of regions is assigned an access control mode of the plurality of access control modes.

* * * * *